(No Model.)

L. A. SIMONS & G. R. ROOF.
TROLLEY WHEEL FOR ELECTRIC CARS.

No. 467,583. Patented Jan. 26, 1892.

Witnesses
L. U. Hammond
H. A. Garner

Inventors.
Levi A. Simons
George R. Roof

THE NORRIS PETERS CO., PHOTO-LITHO., WASHINGTON, D. C.

UNITED STATES PATENT OFFICE.

LEVI A. SIMONS AND GEORGE R. ROOF, OF OMAHA, NEBRASKA.

TROLLEY-WHEEL FOR ELECTRIC CARS.

SPECIFICATION forming part of Letters Patent No. 467,583, dated January 26, 1892.

Application filed January 22, 1891. Serial No. 378,740. (No model.)

*To all whom it may concern:*

Be it known that we, LEVI A. SIMONS and GEORGE R. ROOF, citizens of the United States, residing at Omaha, in the county of Douglas and State of Nebraska, have invented certain new and useful Improvements in Trolley-Wheels for Electric-Motor Street-Cars; and we do declare the following to be a full, clear, and exact description of the invention, such as will enable others skilled in the art to which it appertains to make and use the same, reference being had to the accompanying drawings, and to the letters of reference marked thereon, which form a part of this specification.

Figure 2:
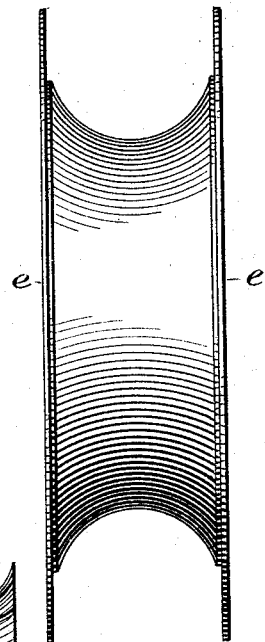

The trolley-wheel now in use on electric-motor street-cars, being the wheel which passes along the overhead conducting-wire, is constructed with the outside circumference having a smooth concave surface, which receives the said wire, Fig. 2, the flanges $e\ e$ preventing the wheel from passing off the wire when pressed against it and in motion. This wheel fails to remove ice and sleet from said conducting-wire while passing over it.

The invention is an improvement in this trolley-wheel, giving it the power and capacity of removing ice and sleet from the conducting-wire by means of sharp and cutting-edged corrugations upon its surface.

Figure 1:
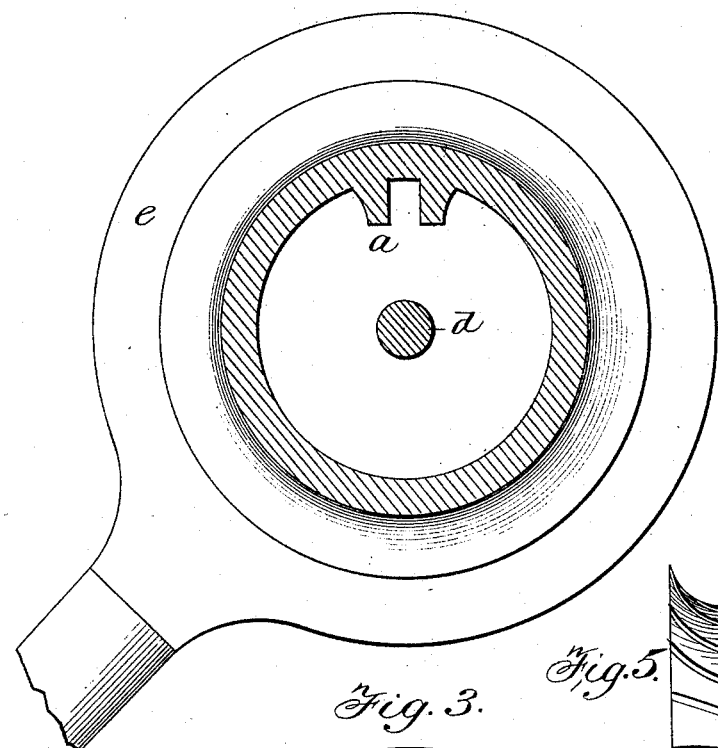
Figure 3:
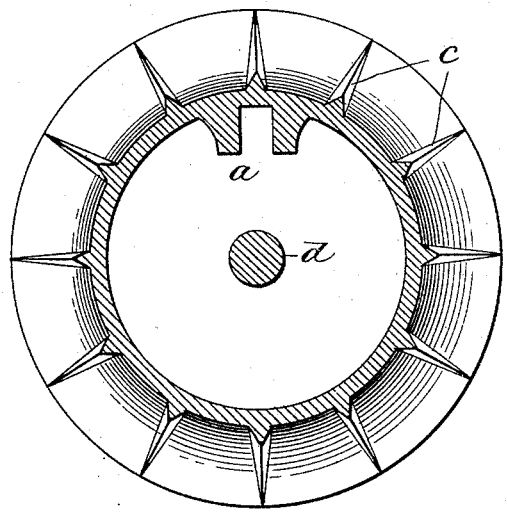
Figure 5:
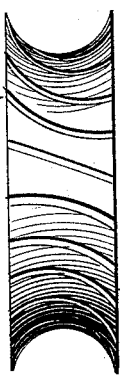
Figure 4:
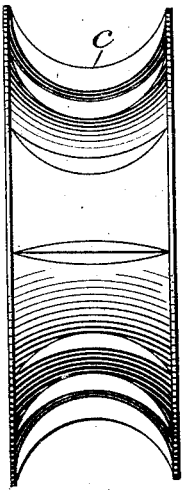

Figure 1 represents the trolley-wheel in use. Fig. 2 represents the trolley-wheel now in use, having a smooth surface. $e\ e$ represent the flanges. Figs. 3 and 4 represent the improved trolley-wheel. $c$ represents the cutting-edged corrugations. Fig. 5 represents the improved trolley-wheel with cutting-edged diagonal corrugations.

The improved trolley-wheel is constructed with cutting-edged corrugations on its concave surface extending across from one flange to the other parallel with the axis of the wheel or at any desired angle with the axis of the wheel—that is, diagonally across said outer surface. The cutting-edged corrugations on the outer surface of the wheel cut and remove the ice and sleet from the wire as the wheel revolves in passing along the wire. The wheel is also rendered a better conductor of the electric current or force by reason of said corrugations, these corrugations to be made of the same material as the wheel or of other material, as desired, and to be placed at any desired distance apart around the circumference of the wheel and of any desired height above the surface of the wheel.

The wheel can be used as forming a part of the circuit, or can be used outside the circuit, as desired.

What we claim as our invention, and desire to secure by Letters Patent, is—

The construction of a trolley-wheel with cutting-edged corrugations on the outer surface of the wheel, substantially as described.

In testimony whereof we affix our signatures in presence of two witnesses.

LEVI A. SIMONS.
GEORGE R. ROOF.

Witnesses:
HANSON A. DARNER,
W. E. FINDLEY.